(12) United States Patent
Bayne

(10) Patent No.: US 7,257,388 B2
(45) Date of Patent: Aug. 14, 2007

(54) PRE-PAID MOBILE PHONE WITH TEMPORARY VOICE MAIL

(76) Inventor: Anthony J. Bayne, 25315 Andreo Ave., Lomita, CA (US) 90717-1715

( * ) Notice: Subject to any disclaimer, the term of this patent is extended or adjusted under 35 U.S.C. 154(b) by 138 days.

(21) Appl. No.: 10/923,631

(22) Filed: Aug. 20, 2004

(65) Prior Publication Data
US 2005/0113073 A1 May 26, 2005

Related U.S. Application Data

(60) Provisional application No. 60/518,888, filed on Nov. 10, 2003.

(51) Int. Cl.
*H04M 11/00* (2006.01)
(52) U.S. Cl. .................. 455/406; 455/413; 455/409; 455/412.1; 379/114.2; 379/127.05
(58) Field of Classification Search ............... 455/406, 455/409, 412.1, 413, 416, 407, 408; 379/114.2, 379/88.18, 67.1, 127.05, 114.02
See application file for complete search history.

(56) References Cited

U.S. PATENT DOCUMENTS

| | | | |
|---|---|---|---|
| 5,797,101 A * | 8/1998 | Osmani et al. ............. 455/551 |
| 6,115,455 A * | 9/2000 | Picard .......................... 379/67.1 |
| 6,157,823 A * | 12/2000 | Fougnies et al. ........... 455/406 |
| 6,356,630 B1 | 3/2002 | Cai et al. |
| 6,434,379 B1 | 8/2002 | Despres et al. |
| 6,526,273 B1 | 2/2003 | Link, II et al. |
| 6,574,479 B1 | 6/2003 | LaGrotta |
| 6,694,003 B1 | 2/2004 | Karam |
| 6,793,135 B1 * | 9/2004 | Ryoo ........................... 235/383 |
| 2001/0000505 A1 | 4/2001 | Segal et al. |
| 2002/0029189 A1 | 3/2002 | Titus et al. |
| 2002/0032752 A1 | 3/2002 | Gold et al. |
| 2002/0067810 A1 | 6/2002 | Barak et al. |
| 2002/0147002 A1 | 10/2002 | Trop et al. |
| 2003/0012345 A1 | 1/2003 | Marsh et al. |
| 2003/0043984 A1 * | 3/2003 | Lauzon .................. 379/144.01 |
| 2003/0045267 A1 | 3/2003 | Himmel et al. |
| 2003/0045269 A1 | 3/2003 | Himmel et al. |
| 2003/0091169 A1 | 5/2003 | Cain |
| 2003/0119477 A1 * | 6/2003 | Uppal et al. ................ 455/408 |
| 2003/0143978 A1 | 7/2003 | Cooper et al. |
| 2003/0193961 A1 * | 10/2003 | Moore et al. ............... 370/401 |
| 2004/0077334 A1 * | 4/2004 | Joyce et al. ................ 455/406 |
| 2004/0114739 A1 * | 6/2004 | Hausmann et al. ...... 379/114.2 |
| 2004/0120475 A1 * | 6/2004 | Bauer et al. ............. 379/88.18 |
| 2004/0185828 A1 * | 9/2004 | Engelhart ................... 455/408 |

* cited by examiner

*Primary Examiner*—Lester G. Kincaid
*Assistant Examiner*—Charles Shedrick
(74) *Attorney, Agent, or Firm*—Sutherland Asbill & Brennan LLP

(57) ABSTRACT

The present invention provides systems and methods for allowing access to a voice mailbox associated with a pre-paid mobile phone subscriber's account after the expiration of the subscriber's credits. A call processing system may be configured to receive a call from a calling party and to connect the call to a voice mailbox system. The call processing system may allow the calling party to record a voice message that can subsequently be accessed by the subscriber for an access fee. The call processing center may also be configured to allow the calling party to add credit to the subscriber's account. Access fees are paid and credits are added to the account by way of pre-paid calling cards, smart cards, credit cards, debit cards, electronic fund transfers.

36 Claims, 5 Drawing Sheets

PRE-PAID MOBILE PHONE WITH TEMPORARY VOICE MAIL

RELATED APPLICATIONS

Application Ser. No. 60/518,888, filed Nov. 10, 2003, which is hereby incorporated by reference as if set forth fully herein

TECHNICAL FIELD

The present invention relates generally to temporary voice messaging services in a prepaid telecommunication system. More particularly, the present invention relates to systems and methods for providing temporary voice mail access for prepaid mobile phone customers whose accounts are not associated with an automatic means of replenishing their accounts and whose accounts have expired, through alternative access voice mail systems associated with the customer's account.

BACKGROUND OF THE INVENTION

A significant number of individuals subscribe to prepaid mobile phone networks for convenience in payment options. Subscribers to prepaid mobile phone networks generally purchase a mobile phone and pay upfront for the amount of credits desired to operate the mobile phone. The credits are depleted through the usage of the mobile phone to place calls, receive calls, access voicemail, and in some instances the subscriber's credits are depleted when a caller leaves a message on the voice mailbox associated with the subscriber's account. Credits may likewise be forfeited for non-use within a specified time frame, such as non-use within 30 days of adding the credit. Typically, when the subscriber reaches a threshold number of credits remaining on the account, a payment may be made to add more credits without interruption of mobile phone service. However, when a subscriber's account reaches a zero balance of credits the mobile phone becomes inactive and becomes unable to place calls, receive calls, or access voicemail features.

Mobile phone service providers typically give clients the option to associate a credit card or bank account to replenish the prepaid account automatically by charging the credit card or automatically withdrawing from the bank account a fixed amount (i.e. $20.00) when the account balance reaches a triggering amount (i.e. $5.00), or by adding credit at a fixed interval (i.e. every 30 days credit the prepaid account $50.00). However, many persons who use prepaid mobile phones lack credit cards, or are unbanked, and so this option is unavailable to them. These persons must add credit to their account while the account still has credit remaining to keep it active. Failure to do so may result in the subscriber losing his phone number, or being charged a fee to "reactivate" the account. In some instances a prepaid mobile phone subscriber, while not having the ability himself to add credit to his account, may have a family member who would be willing to add credit to the account to keep it active if given the opportunity. This circumstance might be found where a child has gone off to college and is temporarily out of money, and the parent would be willing to keep the child's prepaid mobile phone active if asked. When the account credits lapse, the subscriber can no longer use the mobile phone to place or receive calls. Furthermore, when the account credits lapse, the voice mailbox associated with the account can no longer be accessed by the subscriber. Thus, a lapse in account credits effectively terminates, what in many cases, is an individual's only means of telephonic communications. Furthermore, the lack of access to the subscriber's voice mailbox can have severe negative consequences if the subscriber's family or friends need to contact the subscriber for emergency purposes. Therefore, there remains a need for a system to allow a prepaid mobile phone user to have continued access to their voice mailbox after the exhaustion of prepaid credits.

It is well known that prepaid mobile phones are largely marketed to lower income individuals. Many times these individuals rely on the prepaid mobile phone as their sole form of telephonic communication. The families and friends of these prepaid mobile phone subscribers generally can only reach these individuals through a telephone call placed to the phone number associated with the prepaid mobile phone account. When the credits associated with the account are exhausted, the telephone number becomes inactive and the messages saved on the associated voice mailbox are purged or otherwise unavailable. Vital messages can be lost or made inaccessible and the mobile phone subscriber is without means of receiving what may be emergency messages from individuals calling the subscriber's mobile phone number, and while the subscriber may not have the minimum amount required to activate the mobile phone, he may be able to pay a lesser amount to hear an anticipated message. Therefore, there remains a need for an associated voice mailbox, with alternative means of access, so as to allow a subscriber, whose prepaid credits have been exhausted, to receive and check messages left on a voice mailbox associated with the subscriber's mobile phone number.

SUMMARY OF THE INVENTION

The present invention meets the above-described needs by providing a system and method for activating or maintaining a voice mailbox associated with a prepaid mobile phone account when the credits associated with the mobile phone account are exhausted. Credits for a prepaid mobile phone account become exhausted in two situations. One situation may be when the mobile phone subscriber uses all available credits before making a payment to add additional credits to the mobile phone account. A second situation is where credits associated with a mobile phone account have a limited time in which they expire based on a particular date (i.e., credits are valid only for a thirty day period).

The system tracks the level of available credits and may be set to respond with appropriate actions either on the exhaustion of the credits or when the level of credits in a subscriber's account reaches a triggering amount set by the system administrator, for example, when only two credits are remaining on the account. Alternatively, the triggering amount may reached when the account reaches a zero credit balance. When either of these states are reached by the subscriber's account, the system responds by determining the status of the subscriber's voicemail account. If the subscriber's prepaid mobile account has an active voicemail function associated therewith, then this active voicemail account will be utilized by the system. However, if no voicemail account is associated with the subscriber's account, one will be created by the system for usage during the time period where the subscriber's credit is exhausted.

In a preferred embodiment of the system, the subscriber, or an individual designated by the subscriber, will be notified when the credit associated with the mobile phone account becomes exhausted or reaches the designated triggering amount. This call may be operated through the use of an interactive voice response unit or other similar telephonic menu structure that allows the called party to add credit to the exhausted account, before other action within the system becomes necessary. If the subscriber or the designated individual cannot be reached or does not add credit to the mobile phone account then the system proceeds with establishing or verifying the existence of a voice mailbox associated with the subscriber's account.

Once a voice mailbox associated with the subscriber's account is established or verified to already exist, the subscriber's phone number may be directly routed to the voice mailbox. When a phone call is placed to the telephone number associated with the subscriber's mobile phone account, the call accesses the voice mailbox system as opposed to accessing the mobile phone directly. In one embodiment, the voice mailbox system is operated in conjunction with an interactive voice response unit. The interactive voice response unit ("IVR"), may act as the host to the system, providing various options to the caller including the opportunity to add credits to the subscriber's account.

In a further exemplary embodiment, access to the voice mailbox by the subscriber can be regulated through the use of a toll number (i.e., a so-called "900 number"), or an alternative access number. In the case of an alternative access number, the subscriber will be required to provide some means of payment to access the system through the use of a credit card, debit card, prepaid calling card, or other electronic monetary transfer means.

Multiple PIN numbers may be established and provided to the subscriber which may then used by any calling party to access the voice mailbox system. Entry of a PIN number may be required for a calling party to access certain features in the system. One such feature allows the calling party to add credits to the subscriber's account so that the mobile phone number may once again be active and the system may return to its normal operating state.

These and other features, aspects and embodiments of the invention will be described in more detail below.

BRIEF DESCRIPTION OF THE DRAWINGS

FIG. 2, comprising

FIG. 3, comprising

DETAILED DESCRIPTION OF THE INVENTION

Figure 1:
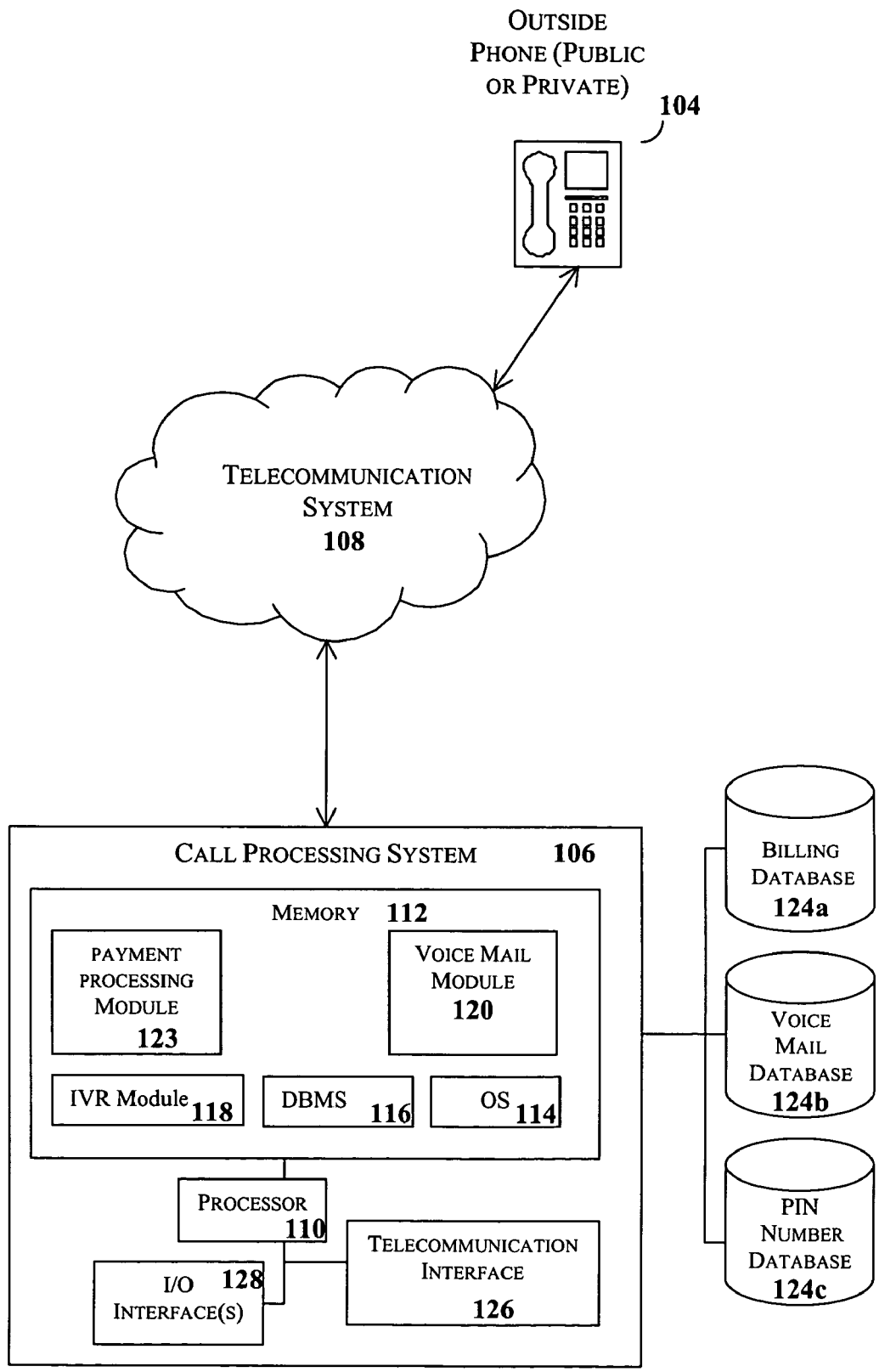
FIG. 1 is a block diagram illustrating an exemplary system in accordance with certain embodiments of the present invention.

The present invention provides systems and methods for allowing access to a voice mailbox associated with a pre-paid mobile phone subscriber's account after the expiration of the subscriber's credits. In one embodiment, no separate charge is made by the system to a party who attempts to call the subscriber and whose call is then forwarded to the voicemail system to leave a message, as anyone calling the lapsed account will believe that the mobile phone subscriber has merely turned his mobile phone "off". Likewise anyone calling the lapsed account, who then is forwarded to voice-mail, having the appropriate PIN, may add credit to the account. However, access to the voice mailbox account's other features are paid by way of pre-paid calling cards, smart cards, credit cards, debit cards, etc. supplied by the calling parties or through the use of a tolled access number ("900 number"). A call processing system may be configured to receive a call and connect the call to a voice mailbox system.

Although the following description of exemplary embodiments will be described in the context of pre-paid mobile phones, it should be understood that the description may also be applicable in other embodiments to other pre-paid telephonic systems where usage of the telephone by the person is dependent on having a positive credit balance. Thus, the term "pre-paid mobile phone" as used herein should be broadly construed as to encompass any type of pre-paid telephonic system where the subscriber's account is terminated when credits corresponding to the subscriber's account have expired.

The present invention may be used to establish a new revenue stream for participating phone companies. Presently, prepaid phone service providers earn no income from client's between the time the client's account balance reaches zero and the time the client adds credit to his account to make the mobile phone functional. Utilizing the disclosed invention takes advantage of this time by providing the client a means to access messages left for him for a fee, while still giving him an incentive to add credit to his phone so that he may make outgoing calls on his mobile phone. A further incentive may be for the service provider to limit access to the voicemail system while the account has a zero credit balance to a short duration, such as 72 hours. As an example, revenue may be collected by a phone company for each and every access to the voicemail account after the subscriber has exhausted their account credits. Payment may be secured each and every time the voice mail system is accessed. Furthermore, the system creates previously non-existent opportunities for the phone company to have third parties, such as the subscriber's friends or family, add credit to a subscriber's account, which beforehand would have simply been terminated at the expiration of the subscriber's credits. The phone company also may save on administrative costs involved with the creation of a new account for a subscriber who is forced to sign up for a new account after their prior one has been terminated.

The present invention also provides benefits to friends and family members of pre-paid mobile phone subscribers. Through use of the invention, these parties will be able to stay in communication with a subscriber, even after the subscriber's pre-paid mobile phone credits expire. The messaging services of the present invention may allow a subscriber, whose only means of telephonic communication is their pre-paid mobile phone, to be reached by family members or friends in the case of an emergency, where before the voice mailbox account would simply be terminated or otherwise inaccessible.

Exemplary embodiments of the present invention will hereinafter be described with reference to the figures, in which like numerals indicate like elements throughout the several drawings. FIG. 1 is a block diagram illustrating an exemplary operating environment for implementation of certain embodiments of the present invention. The exemplary operating environment includes at least one public or private telephone separate from the pre-paid mobile phone ("outside phone") 104 and a call processing system 106. A telecommunication system 108 connects the outside phone 104 and the call processing system 106.

The telecommunication system 108 may be any public and/or private communication network. In certain embodiments, the telecommunication system 108 is the Public Switched Telephone Network (PSTN). The telecommunication system 108 may include wired and/or wireless segments and may carry digital and/or analog signals. In alternate embodiments, the telecommunication system 108 may take other forms, such as a voice over IP network or other types of data networks. The various components and functionality of typical telecommunication systems 108 are well known in the art and are therefore not reiterated herein.

The outside phone(s) 104 may be any traditional telephones or other communication devices that are configured to interact with a telecommunication system 108. For example, the outside phone(s) 104, may be analog or digital, such as Touch-Tone telephones, rotary telephones, cellular or mobile phones, and the like. In other embodiments, the outside phone(s) 104 could be replaced or supplemented by other communication devices, such as personal computers, laptop computers, hand-held computers, personal digital assistants ("PDA"), pagers, etc., as may be appropriate.

The call processing system 106 is contemplated as being a processor-driven device or collection of devices that is configured for receiving and processing telephone calls. The call processing system 106 may further be configured for accessing and reading associated computer-readable media having stored thereon data and/or computer-executable instructions for implementing the various methods of the present invention. In particular, the call processing system 106 may be driven by a processor 110 for processing data and executing computer-executable instructions. The call processing system 106 also includes a memory 112, which may take the form of any computer-readable medium. The memory 112 may be logically and/or physically divided into multiple units.

The memory 112 stores data and program modules, such as, for example, an operating system ("OS") 114, a database management system ("DBMS") 116, an Interactive Voice Response ("IVR") module 118, a voice mail module 120, and a payment processing module 123. These and/or other programs may be executed by the call processing system 106 to perform the various methods of the present invention. By way of example, the IVR module 118 may provide functionality for responding to voice or other responses, such as Touch Tones, provided by a caller to the call processing system 106. The voice mail module 120 may provide functionality for recording, storing and retrieving voice messages. The payment processing module 123 may provide functionality for accepting payment from a calling party to provide access to the voicemail module 120 or to add credit to the subscriber's pre-paid account.

IVR functionality, voice mail functionality and payment acceptance functionality are well known in the art and are therefore not explained in detail herein. Those skilled in the art will appreciate that such functionality may be combined into fewer program modules or distributed among a greater number of modules than are illustrated in FIG. 1. In addition, such functionality may be distributed across multiple processor-driven devices, such as dedicated network servers, that collectively form the call processing system 106.

The call processing system 106 may include or be in communication with one or more databases. By way of illustration only, the call processing system 106 may be in communication with a billing database 124*a* for storing payment information, a voice mail database 124*b* for storing voice messages and a personal identification number database 124*c* for storing a list of PIN numbers and their associated access privileges within the call processing system 106.

These and/or other databases may of course also store any other data used or generated by the call processing system 106. Those skilled in the art will appreciate that the illustrated databases 124*a-c* may be physically and/or logically separate from one another. For security, the call processing system 106 may have a dedicated connection to the databases 124*a-c*, as shown. However, the call processing system 106 may also communicate with one or more of the databases 124*a-c* via the telecommunication system 108 or other network.

The call processing system 106 may communicate periodically with the billing database 124*a* to determine the level of credits remaining in a subscriber's account. A triggering amount may be predetermined by a system administrator corresponding to a minimum level of credits remaining in a subscriber's account. If no triggering amount is predetermined, the system may operate as described by treating zero credits as the triggering amount. While the subscriber's account credits remain at a level greater than the triggering amount, the system operates as normal.

When the call processing system 106 determines that a subscriber's account credit level has reached the triggering amount, the IVR module 118 may operate to place a call to the subscriber. In an alternative embodiment, the subscriber may designate a third party individual to be contacted in the event that the triggering point is reached in the subscriber's account. The IVR module 118 may place a call to the pre-determined phone number. The called party may then be informed as to the status of the subscriber's account credit level. Subsequently, the IVR module 118 may query the called party as to whether they will add credits to the subscriber's account. It should be understood that the operation of the IVR module 118 may also be performed by an email message being sent to the designated third party with instructions on how to add credit to the subscriber's account, or a live individual calling the predetermined party or other interactive menu systems known in the art.

If the called party chooses to add credits to the subscriber's account, the call processing system, 106 operates through the payment processing module 123 and requests that the called party input payment information. For example, the IVR module 118 may instruct the calling party to indicate the amount of credit which they would like to add to the subscriber's account and subsequently input a valid pre-paid calling card number, credit card number, debit card number, or other form of payment.

If the called party chooses not to add credits to the subscriber's account, then the phone call to the called party is terminated. The system may then query the voice mail module 120 to determine if the subscriber's account has an associated voice mailbox. If no voice mailbox exists associated with the subscriber's account, the voice mail module 120 may create a voice mailbox and associate it with the subscriber's account. If a voice mailbox is already associated with the subscriber's account, then the established voice mailbox may be used for the purposes of this invention.

Telephone calls may be received at the call processing system 106 through a telecommunication interface 126. The telecommunication interface 126 may take the form of a telephony line card or other suitable hardware and/or software for connecting the call processing system 106 to the telecommunication system 108 and providing the logical connection between the call processing system 106 and outside phones 104. The telecommunication interface 126 thus allows the caller to interact with the call processing system 106 by providing voice commands or Touch-Tone commands that can be interpreted by the IVR module 118 and/or other program modules. The call processing system 106 may be configured with additional and/or other communication interfaces for providing logical connections to other types of communication devices and networks.

The call processing system 106 may also include input/output ("I/O") interface(s) 128 for providing logical connections to various I/O devices, such as a keyboard, a mouse, a microphone, a printer, a scanner, speakers, a display, etc. A system administrator may utilize these and other I/O devices to interact with the call processing system 106. For example, a system administrator may interact with the call processing center 106 to populate and edit the PIN number database 124c, download billing and payment information from the billing database 124a, alter the parameters for the IVR module 118, the voice mail module 120 and other program modules, etc. Those skilled in the art will appreciate that the call processing system 106 may include alternate and/or additional components, hardware or software.

Thus configured or similarly configured, the call processing system 106 may provide the hardware and software to support the creation and maintenance of a voice mailbox system associated with a subscriber's account. The call processing system 106 may be programmed to receive calls from an outside phone 104. The call processing system 106, by way of the IVR module 118 for example, may require the calling party to enter a PIN number and the system 106 may then make a determination of whether to allow access to the voice mailbox. Using this technique, the subscriber can limit the number of individuals with the privilege to leave voice messages for the susbscriber, as the subscriber will be responsible for paying for access to listen to the recorded messages. The call processing system may also determine whether the calling party will be allowed to add credit to a subscriber's account. If no valid PIN number is entered by the calling party, the call may be terminated.

If the outside party's call is accepted for processing, the call processing system 106 may prompt the calling party to indicate whether instructions for using the service should be provided in English, Spanish or another available language option. For example, the IVR module 118 may prompt the calling party to press a key corresponding to a language selection or to say the name of the desired language. The IVR module 118 may also be programmed to advise the calling party that outside calling parties will incur charges to leave voice messages for the subscriber. Other terms and conditions for use of the services provided by the call processing system 106 may be audibly presented to the calling party, for example by the IVR module 118.

When a calling party accesses the call processing system 106 from an outside phone 104, the calling party may be prompted to choose whether he or she desires to add credit to the subscriber's account or to access the voice mail system. By way of example, if the calling party desires to add credit to the subscriber's account, the IVR module 118 may instruct the calling party to indicate the amount of credit which they would like to add to the subscriber's account and subsequently input a valid pre-paid calling card number, credit card number, debit card number, or other form of payment. The call processing system 106 may then add the indicated number of credits to the subscriber's account. In this manner, the subscriber's account again becomes active and the subscriber may be notified by the system, for example, via a SMS textmessage or IVR automated call, that the pre-paid mobile phone account is now active. The call processing center 106 may also inform the subscriber of the amount of credits which have been added to the account. Other methods for accepting payment though a telephonic system are known in the art and are contemplated herein. In the preferred embodiments, all payment processing and verification services involving the calling party are handled by the telecommunication system 108, for example by a participating telephone company.

If the calling party selects not to provide payment for the purpose of adding credits to the subscriber's account, the call processing system 106 (e.g., via the IVR module 118) may inform the calling party of other options available on the system, such as leaving a voice message for the subscriber or listening to a voice message from the subscriber. An access code and pre-paid calling card number, credit card number, debit card number, or other form of payment may be required to gain access to these features. As one example, an access code may consist of the personal identification number predetermined by the subscriber or the system administrator that is assigned to a particular level of access within the system. The call processing system 106 may provide the access code and the phone number for the voice mail system to the outside party or the responsibility to disseminate that information may be left to the subscriber. In certain embodiments, the call processing system 106 may separately mail or otherwise communicate the PIN number and/or the "900 access number" assigned to the subscriber's temporary account to one or more outside parties designated by the subscriber.

If the calling party desires to access the voice mail system, the IVR module 118 may interact with or pass the call off to the voice mail module 120. The voice mail module may be configured for recording, storing and playing voice messages. In certain embodiments, a subscriber may be allowed only a single outgoing voice message and anyone with access to the outgoing voice mailbox may be able to hear the message stored therein.

Those skilled in the art will appreciate that the operating environment shown in and described with respect to FIG. 1 is provided by way of example only. Numerous other operating environments, system architectures and device configurations are possible. For example, the call processing center may in certain embodiments be implemented at or within the an existing telecommunications system. In other embodiments, various components of the PSTN may be adapted for performing the functionally described with respect to the present invention. Accordingly, the present invention should not be construed as being limited to any particular operating environment, system architecture or device configuration.

Figure 2A:
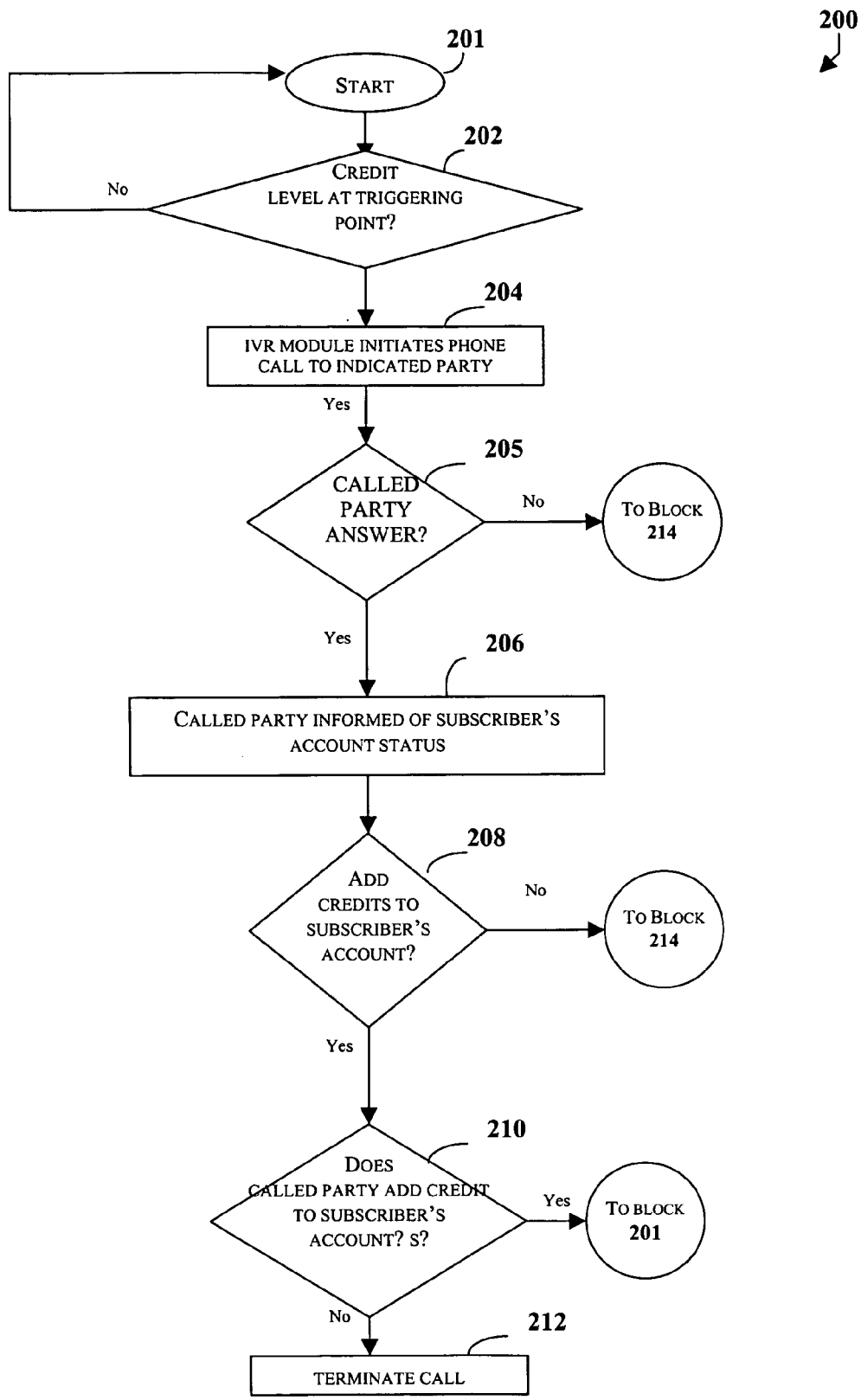
FIG. 2a and FIG. 2b, is a flow diagram illustrating an exemplary method for establishing or maintaining a voice mailbox associated with the subscriber's account after the triggering amount has been reached in accordance with certain embodiments of the present invention.
Figure 2B:
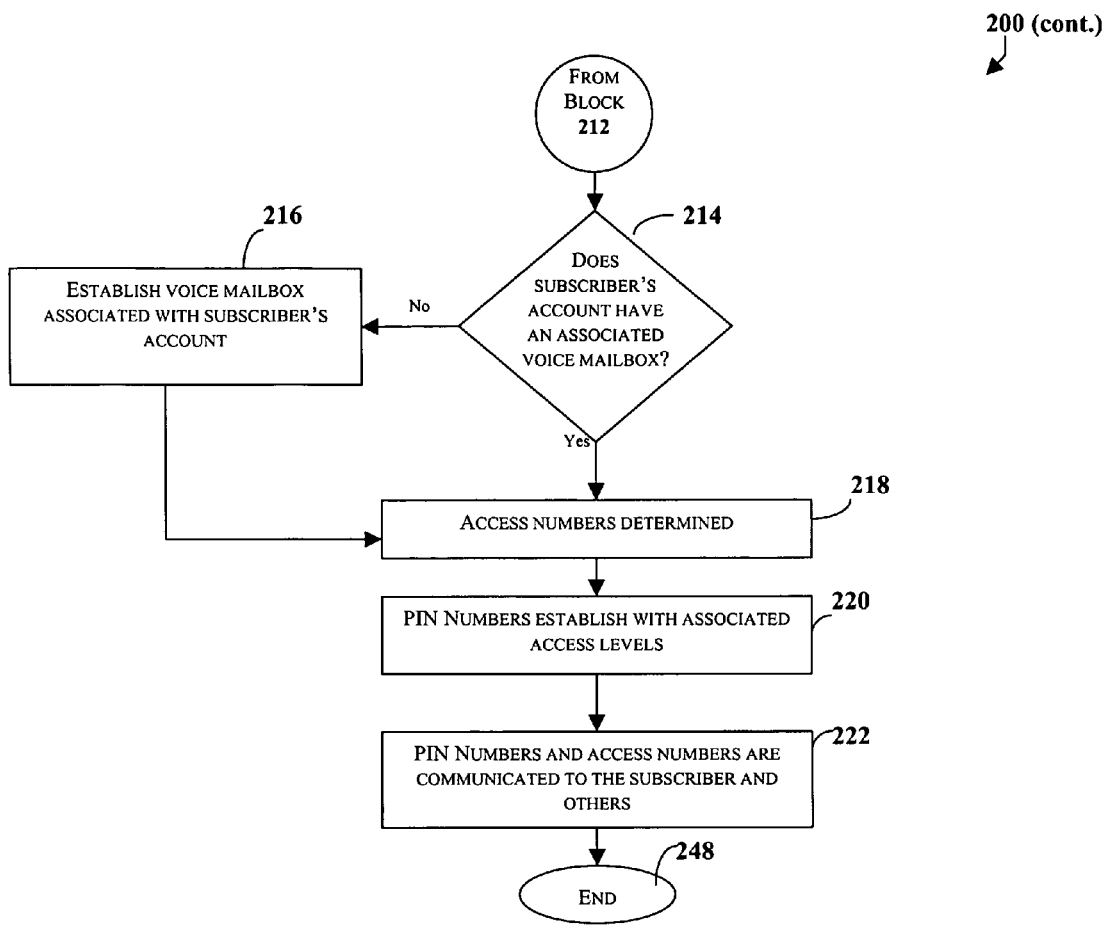

FIG. 2 is a flow diagram illustrating an exemplary method for determining whether a subscriber's account credits have reached a triggering point and the establishment or maintenance of an associated voice mailbox, in accordance with certain embodiments of the invention. The method begins at starting block 201 which represents the normal operating state of an active subscriber's account containing credits greater than the triggering amount. The method progresses to block 202, where the call processing system 106 queries the billing database 124a to determine the amount of credits in the subscriber's account. If the determined number of credits in the subscriber's account is greater than the amount represented by the triggering amount, then the method returns to starting block 201, and the system continues normal operation. In certain embodiments of this invention, the triggering point may simply represent the point at which credits in the subscriber's account become exhausted.

If the call processing system 106 determines that the number of credits in the subscriber's account is at a level equal to or below the triggering point then the method progresses to block 204. At block 204 the IVR module 118 may initiate contact to the subscriber or to a party that the subscriber has previously designated to receive the phone call in this situation. While the present embodiment is described wherein the contact is made via a telephone call, it is understood that the contact may take place through other means, such as electronic mail. If, at block 205, the IVR module 118 reaches the called party, the method progresses to block 206, where the IVR module 118 proceeds to inform the called party about the status of the subscriber's account. The IVR module may describe the possible means by which the called party may add credits to the subscriber's account. If, at block 205, the IVR module 118 cannot reach the called party, the method progresses to block 214.

The method then progresses to block 208 where the IVR module 118 may query the called party as to whether or not they wish to add credits to the subscriber's account. If the called party indicates that they do not wish to add credits to the subscriber's account, the phone call is terminated and the method proceeds to block 214. However, if the called party chooses to add credits to the subscriber's account, the method progresses to block 210 where the IVR module 118 requests relevant payment information from the called party, including the amount the called party wishes to add to the subscriber's account and the means by which they will pay, which may be input for example through voice responses or the pressing of keys on the telephone keypad. The payment processing module 123 then may attempt to validate the payment information. If the provided payment information proves to be valid, then the indicated number of credits is added to the subscriber's account and the method returns to starting block 201, and the system continues normal operation. If the payment information is not valid, the IVR module 118 may request the information be re-input a second time. If after a pre-determined number of attempts, the call processing system 106 may terminate the call at block 212 and the method progresses to block 214.

At block 214, if the called party did not add credit to the subscriber's account, the call processing system 106 may query the voice mail module 120 to determine if the subscriber's account has an associated voice mailbox. If the system determines that a voice mailbox exists which is associated with the subscriber's account, then the method progresses to block 218. However, if no voice mailbox exists which is associated with the subscriber's account, the method progresses to block 216, where one may be created by the voice mail module 120. The newly created voice mailbox becomes associated with the subscriber's account, and the method progresses to block 218.

Once a voice mailbox is established and associated with the subscriber's account, block 218 proceeds by determining the means of access to the voice mailbox account. This determination may be made on a case by case basis, for example, or may be made based on certain criteria as defined by the system administrator. For illustration, the call processing system 106, may continue using the telephone number currently associated with the subscriber's account as the access number to the voice mailbox. In other embodiments, a "900 number" may be established for purposes of accessing the system. Once the access number for the subscriber's voice mailbox is established, the method progresses to block 220.

In an exemplary example of the system, separate PIN numbers may become associated with accessing the subscriber's voice mailbox. At block 220 the system may associate PIN numbers from the PIN number database 124c with the subscriber's account. Each PIN number may correspond to a different level of access within the system. For example, one PIN number may solely provide the calling party access to the feature which allows the calling party to add credits to the subscriber's account. A second PIN number may provide the calling party the ability to add credits to the subscriber's account, plus the ability to leave messages for the subscriber.

It is understood that the present invention is not limited to these options and PIN numbers may be created with any combination of access levels and associated features. Once the PIN numbers are established, the method progresses to block 222 where the PIN numbers and access numbers are communicated to the subscriber or other pre-designated party. This communication may take place through an automated phone call, a live operator phone call, or through mailing the relevant numbers to the subscriber. Alternatively, PIN numbers, with their associated capabilities, may be issued to the subscriber at the same time the pre-paid mobile phone is purchased by the subscriber and the account is activated. Other methods of communicating information through mail or telephone are well known and not described herein. After communication of the PIN numbers and access numbers, the exemplary method ends at block 248.

Figure 3A:
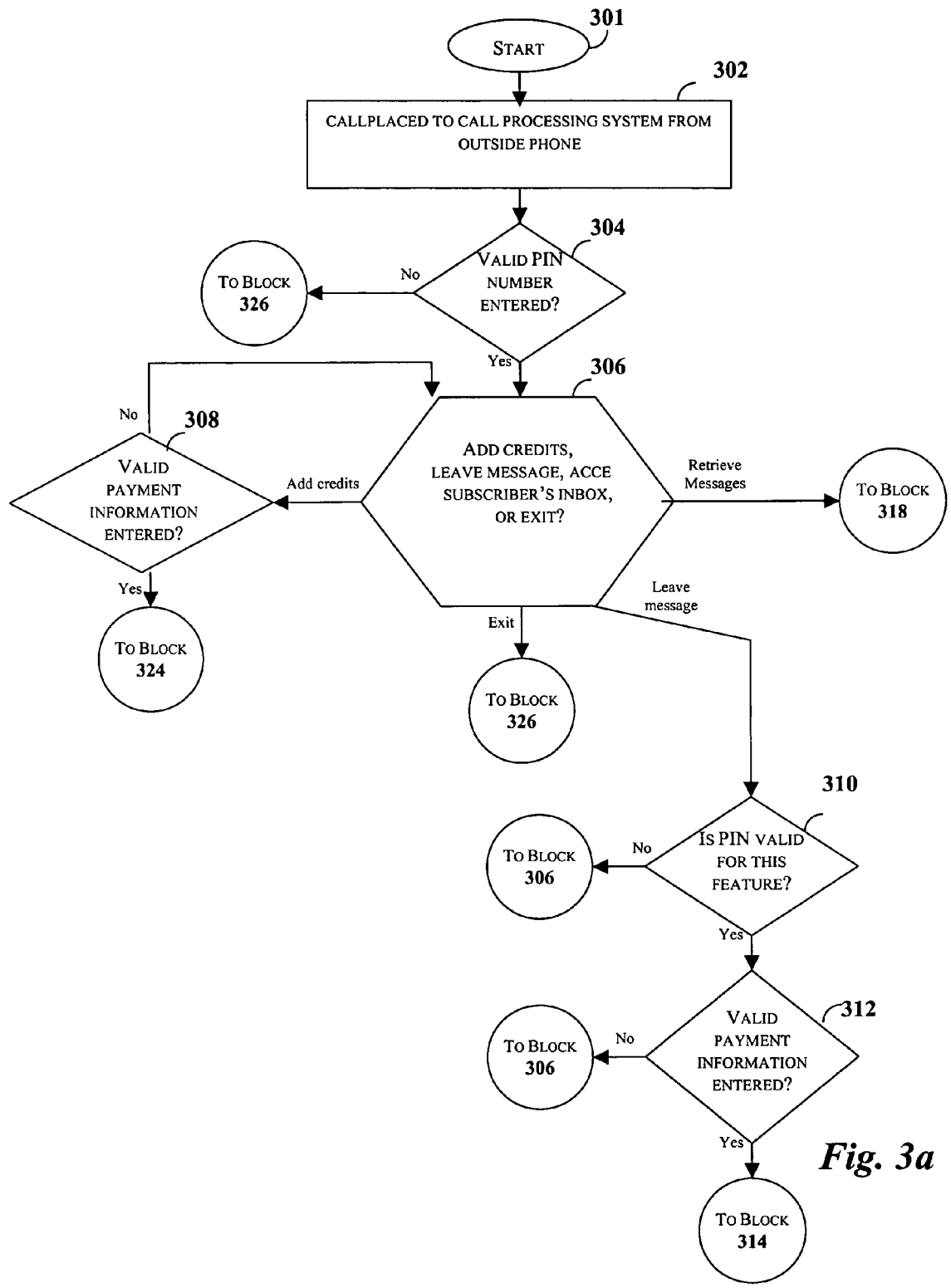
FIG. 3a and FIG. 3b, is a flow chart illustrating an exemplary method for processing a call to the call processing system in accordance with certain embodiments of the present invention.
Figure 3B:
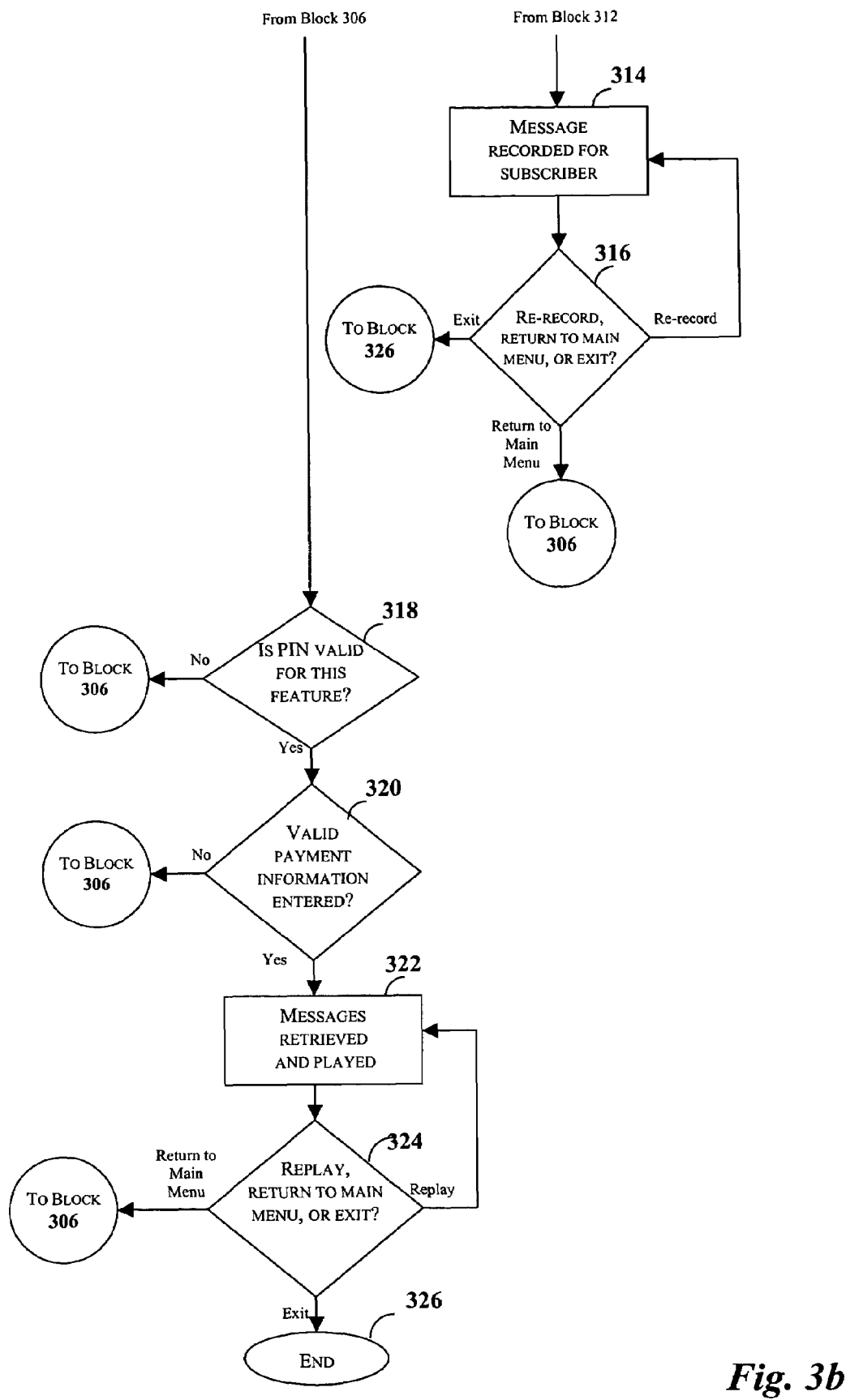

FIG. 3 is a flow diagram illustrating an exemplary method for processing an incoming call placed to the call processing system 106, in accordance with certain embodiments of the invention. The method begins at starting block 301 and progresses to block 302, where a call is initiated to the call processing system 106 using an outside phone 104. The incoming call may be placed by dialing the phone number associated with the subscriber's account, by dialing a pre-assigned "900 number" assigned to the voice mailbox associated with the subscriber's account, or some other access number (e.g., an "800 number" where the party must pay with a credit card). While the following method is described in terms of a non "900 number" phone call, it would be clear to those skilled in the art how to replace billing by credit card with "900 number" tolls.

Next at block 304, the call processing system 106 receives the incoming call and requests the entry of an access code, for example, requesting a PIN number through the IVR module 118. A list of authorized PIN numbers and their corresponding access levels may be stored, for example, in a PIN number database 124c. Thus, as an incoming call is received by the call processing center 106, the PIN number may be identified and the database 124c may be interrogated based on the entered PIN number. If the PIN number cannot be verified as valid to enter the voice mail system, the exemplary method ends at block 326.

In certain embodiments, any call placed from an outside phone 104 may be accepted by the call processing system 106 for the purpose of adding credit to the subscriber's account. In such embodiments, the call processing system 106 must be configured to allow payment to add credits to the subscriber's account prior to requesting a PIN number to access voice mailbox services. Again, a PIN number database 124c may be interrogated to determine if the inputted PIN number is recognized as being valid to access voice mailbox functionality. If the PIN number cannot be identified as valid, the call processing system 106 may allow the calling party to re-enter the PIN number a second time. After a predetermined number of allowed attempts by the calling party to enter a valid PIN number, the call may be dropped and the exemplary method ends at block 326.

If the incoming call is verified through the entry of a valid PIN number, the method proceeds to block 306, where the IVR module 118 may present a menu to the calling party. In an exemplary example of the present invention, the menu presented may consist of four options. The calling party may choose to add credits to the subscriber's account, leave a message for the subscriber, access the subscriber's voicemail inbox, and exit the system. Each option may correspond to a number to be input to the system by the calling party through speaking the option or depressing the corresponding key on the telephonic keypad. If the calling party chooses to add credits to the subscriber's account, the method progresses to block 308 where the IVR module 118 requests relevant payment information from the called party, including the amount the called party wishes to add to the subscriber's account and the means by which they will pay, which may be input for example through voice responses or the pressing of keys on the telephone keypad.

The payment processing module 123 may then attempt to validate the payment information. If the provided payment information proves to be valid, then the indicated number of credits is added to the subscriber's account and the call may be terminated, and the exemplary proceeds to block 324. If the payment information is not valid, the IVR module 118 may request the information be re-input a second time. After a pre-determined number of attempts, the call processing system 106 may terminate the call and the method progresses to block 326. In an alternative embodiment of the present invention, if the payment information is not valid, the system may return the calling party to block 306 to allow the calling party to access other functions.

If, at block 306, the calling party chooses to leave a message to the subscriber, the method progresses to block 310 where the PIN number entered by the calling party is verified by the PIN number database 124c to determine if the calling party has access to the feature of leaving a message for the subscriber. If it is determined at block 310 that the PIN number does permit access to the feature of leaving a message for the subscriber, the exemplary method progresses to block 312 where payment may be secured from the calling party. If the PIN number does not permit access to the selected feature, the method may return to the main menu at block 306. In alternative embodiments of the present invention, if the PIN number does not permit access to the selected feature, the exemplary method ends at block 326 and the call is terminated.

At block 312, the IVR module 118 may request relevant payment information from the calling party, indicating the amount the calling party needs to pay to leave a message for the subscriber and requesting the means by which they will pay, which may be input for example through voice responses or the pressing of keys on the telephone keypad. The IVR module 118 may also present an option for the calling party to return to the main menu. If this option is selected, the method returns to block 306. Otherwise, the payment processing module 123 then may attempt to validate the payment information. If the provided payment information proves to be valid, then the method progresses to block 314. If the payment information is not valid, the IVR module 118 may request the information be re-input a second time. After a pre-determined number of attempts, the call processing system 106 may terminate the call and the method progresses to block 326.

Once payment is secured by the payment processing module 123 the exemplary method proceeds to block 314, where the messages may be recorded and stored on the voice mail database 124b. The recorded messages may be stored in a voice mail database 124b associated with the call processing system 106, or may be part of an independent voice mail system to which the calling party's message is forwarded. After the message has been recorded from the calling party, the exemplary method proceeds to block 316 where IVR module 118 may query the calling party as to whether they would desire to re-record the message, return to the main menu, or exit the system. If the calling party chooses to quit, the exemplary method ends at block 326. If the calling party chooses to record the message again, the exemplary method returns to block 314 so that the message may be rerecorded. If the calling party chooses to return to the main menu, the exemplary method returns to block 306.

If, at block 306, the calling party, which may be the subscriber, chooses to retrieve messages from the subscriber's voice mailbox, the method progresses to block 318 where the PIN number entered by the calling party may be verified through the PIN number database 124c to determine if the calling party has access to the feature of retrieving messages from the subscriber's voice mailbox. If it is determined at block 318 that the PIN number does permit access to the feature of retrieving messages from the subscriber's voice mailbox, the exemplary method progresses to block 320 where payment may be secured from the calling party. If the PIN number does not permit access to the selected feature, the method may return to the main menu at block 306. In alternative embodiments of the present invention, if the PIN number does not permit access to the selected feature, the exemplary method ends at block 326 and the call is terminated.

Once payment is secured by the payment processing module 123 the exemplary method proceeds to block 322, where messages in the subscriber's voice mailbox are retrieved and played. Voice messages may be retrieved and played, for example, in successive order from newest to oldest. The calling party may be provided with the opportunity to skip messages, replay messages, delete messages and to perform other typical voice mail functions. After the calling party finishes listening to voice messages at block 322, the method progresses to block 324 where the IVR module 118 may query the calling party as to whether they would desire to return to the main menu or exit the system. If the calling party chooses to quit, the exemplary method ends at block 326. If the calling party chooses to return to the main menu, the exemplary method returns to block 306.

As may be seen from the foregoing, the present invention provides systems and methods for providing voice mail service for a pre-paid mobile phone subscriber whose account credits have expired. It should be appreciated that the exemplary aspects and features of the present invention as described above are not intended to be interpreted as required or essential elements of the invention, unless explicitly stated as such. It should also be appreciated that the foregoing description of exemplary embodiments was provided by way of illustration only and that many other modifications, features, embodiments and operating environments are possible. Accordingly, the scope of the present invention should be limited only by the claims to follow.

I claim:

1. A method for providing access to a voicemail backup system associated with a pre-paid mobile phone account, comprising:
    determining whether an amount of credits associated with the account has reached a triggering amount;
    determining whether an existing voice mailbox is associated with the account;
    keeping the associated voice mailbox active after the account balance has reached the triggering amount when the existing voice mailbox is associated with the account;
    providing a new service comprising, associating a newly created voice mailbox with the account, when no existing voice mailbox is associated with the account; and
    routing calls made to the account, to either the existing, or the newly created voice mailbox.

2. The method of claim 1, further comprising the step of receiving payment for access to the voice mailbox on a pay as you go basis after the account has reached a zero balance.

3. A computer-readable medium having stored thereon computer-executable instructions for performing the method of claim 1.

4. The method of claim 1, further comprising the step of limiting the duration of allowed access to the voice mailbox after the account has reached a zero balance.

5. A computer-readable medium having stored thereon computer-executable instructions for performing the method of claim 4.

6. The method of claim 1, further comprising the step of establishing a tolled access number associated with the account.

7. The method of claim 1, wherein an access fee is paid by a toll charge billed to a phone bill, a prepaid calling card, a credit card or a debit card.

8. The method of claim 1, further comprising the steps of:
    receiving an incoming call;
    requesting an access code to be entered;
    verifying that the entered access code is valid; and
    determining the features available for the calling party based on the entered access code.

9. The method of claim 8, wherein the features available are selected from one of the group consisting of recording an outgoing greeting, playing all messages left for the subscriber, adding credits to the account, and leaving messages for the subscriber.

10. A computer-readable medium having stored thereon computer-executable instructions for performing the method of claim 8.

11. A system for providing access to a voicemail backup system associated with a pre-paid mobile phone account, comprising:
    means for determining whether an amount of credits associated with the account has reached a triggering amount;
    means for placing a system-initiated outgoing contact to a predetermined party;
    means for determining whether the predetermined party provides payment to add credits to the account if the party receives the outgoing contact;
    means for adding the credits to the account if the predetermined party provides the payment;
    means for determining when an existing voice mailbox is associated with the account if the predetermined party is not contacted or if the party does not provide payment;
    means for associating a newly created voice mailbox with the account when no existing voice mailbox is associated with the account; and
    means for routing calls made to the account, to either the existing, or the newly created voice mailbox.

12. The system of claim 11, further comprising means for receiving payment for access to the voice mailbox on a pay as you go basis after the account has reached a zero balance.

13. The system of claim 11, where the outgoing contact is attempted by means of a phone call by a live operator, an automated interactive voice response unit solicitation, or an e-mail to the predetermined party.

14. The system of claim 11, further comprising means to provide the predetermined party with the phone number associated with the account and a personal identification number to allow the predetermined party to add credit to the account.

15. The system of claim 14 where the personal identification number is issued to the subscriber for redistribution to parties of the subscriber's choice.

16. The system of claim 11, where the predetermined party adds credit to the account by a credit card, debit card, prepaid calling card, electronic funds transfer from the predetermined party's checking account, or a charge to the predetermined party's phone account.

17. The system of claim 11 further comprising means for limiting the duration of allowed access to the voice mailbox after the account has reached a zero balance.

18. The system of claim 11, further comprising means for establishing a tolled access number associated with the account.

19. The system of claim 11, wherein an access fee is paid by the subscriber through a toll charge, a prepaid calling card, a credit card, or a debit card.

20. The system of claim 11, further comprising the steps of:
    means for receiving an incoming call;
    means for requesting an access code to be entered;
    means for verifying that the entered access code is valid; and
    means for determining the features available for the calling party based on the entered access code.

21. The system of claim 20, wherein the features available include recording an outgoing message, playing messages left for the subscriber, adding credits to the account, and leaving messages for the subscriber.

22. A system for providing access to a voicemail backup system associated with a pre-paid mobile phone account, comprising:
    a call processing system for determining whether an amount of credits associated with a subscriber's account has reached a triggering amount;
    a telecommunication interface for placing a system-initiated outgoing contact to predetermined party;
    a payment processing module for determining whether the contacted party provides payment to add credits to the subscriber's account if the contacted party answer the outgoing contact;
    a payment processing module for adding the credits to the subscriber's account if the contacted party provides the payment;
    a voice mail database for determining whether an existing voice mailbox is associated with the subscriber's account if the called party does not answer or if the contacted party does not provide payment;

a voice mail database for associating a newly created voice mailbox with the subscriber's account when no existing voice mailbox is associated with the subscriber's account; and a personal identification number database for establishing access codes corresponding to different levels of access to features in either the existing, or the newly created voice mailbox.

23. The system of claim 22, further comprising a personal identification number database for providing the access codes to the subscriber or another predetermined party.

24. The system of claim 22, further comprising a call processing system for establishing a tolled access number associated with the subscriber's account.

25. The system of claim 22, wherein an access fee is paid by the contacted party using a toll charge billed to a phone bill of the contacted party, a prepaid calling card, a credit card, or a debit card.

26. The system of claim 16, further comprising:
a call processing system for receiving an incoming call from a calling party;
an input/output interface for requesting an access code to be entered by the calling party;
a personal identification number database for verifying that the entered access code is valid; and
a personal identification number database determining the features available for the calling party based on the entered access code.

27. The system of claim 20, wherein the features available for the calling party are selected from the group of features consisting of recording a message for the subscriber, playing a message recorded by the subscriber, providing access to all recorded messages, and adding credits to the subscriber's account.

28. The method of claim 1, wherein the triggering amount is equal to a zero balance.

29. The system of claim 11, wherein the triggering amount is equal to a zero balance.

30. The system of claim 11, wherein the predetermined party is not the prepaid mobile subscriber.

31. The system of claim 22, further comprising means for routing a call to either the existing, or the newly created voice mailbox after credits associated with the subscriber's account have reached the triggering amount.

32. The system of claim 22, wherein the triggering amount comprises a zero balance.

33. The system of claim 22, wherein the predetermined party is not the prepaid mobile subscriber.

34. The system of claim 1, further comprising means for routing a call to either the existing, or the newly created voice mailbox after credits associated with the subscriber's account have reached the triggering amount.

35. The system of claim 11, further comprising means for routing a call to either the existing, or the newly created voice mailbox after credits associated with the subscriber's account have reached the triggering amount.

36. The system of claim 11, further comprising means for keeping the existing voice mailbox active after the account balance has reached the triggering amount, if an existing voice mailbox is associated with the account.

* * * * *